(12) United States Patent
Nuss et al.

(10) Patent No.: US 9,860,126 B2
(45) Date of Patent: *Jan. 2, 2018

(54) METHOD AND SYSTEM FOR COORDINATING CELLULAR NETWORKS OPERATION

(71) Applicant: CISCO TECHNOLOGY, INC., San Jose, CA (US)

(72) Inventors: Ziv Nuss, Tzur Yigal (IL); Eitan Yehuda, Ra'anana (IL); Shay Laslo Amit, Kfar Saba (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/145,466

(22) Filed: May 3, 2016

(65) Prior Publication Data
US 2016/0248632 A1     Aug. 25, 2016

Related U.S. Application Data

(63) Continuation of application No. 14/514,732, filed on Oct. 15, 2014, now Pat. No. 9,369,893, which is a
(Continued)

(51) Int. Cl.
*H04M 3/00* (2006.01)
*H04L 12/24* (2006.01)
(Continued)

(52) U.S. Cl.
CPC ....... *H04L 41/0823* (2013.01); *H04B 17/318* (2015.01); *H04L 41/08* (2013.01);
(Continued)

(58) Field of Classification Search
CPC ..... H04W 24/00; H04W 8/245; H04W 72/04; H04L 47/10
(Continued)

(56) References Cited

U.S. PATENT DOCUMENTS 6,839,766 B1   1/2005   Parnafes et al.
8,903,373 B1   12/2014  Nuss et al.
(Continued)

OTHER PUBLICATIONS

Schmelz, Lars Christoph, "SON Coordinator—SOCRATES Approach," Nokia Siemens Networks, FP7 ICT-SOCRATES, Oct. 20, 2010, 18 pages.

*Primary Examiner* — Danh Le

(57) ABSTRACT

A SON element which is operative to carry out at least two different SON functions is provided, wherein each of the SON functions is associated with at least one SON related action, and wherein a SON related action, initiated by triggering a SON function, would have been adversely affected by another SON related action, initiated by triggering another SON function, had the SON element not affected a modification in operating conditions of the cellular network, wherein the SON element is operative to: (a) assign priorities to the different SON functions; (b) assign different weights to the SON related actions; and (c) coordinate execution of SON related actions, that when executed are carried out in a way that does not breach the priorities hierarchy and the weights' order assigned to the SON related actions, thereby improving operation of the cellular network.

20 Claims, 6 Drawing Sheets

Related U.S. Application Data continuation of application No. 13/902,906, filed on May 27, 2013, now Pat. No. 8,903,373.

(51) Int. Cl.
| | | |
|---|---|---|
| *H04W 24/02* | (2009.01) | |
| *H04W 24/04* | (2009.01) | |
| *H04W 72/10* | (2009.01) | |
| *H04B 17/318* | (2015.01) | |
| *H04L 5/00* | (2006.01) | |
| *H04Q 11/04* | (2006.01) | |
| *H04W 84/18* | (2009.01) | |
| *H04W 84/04* | (2009.01) | |

(52) U.S. Cl.
CPC ........ *H04L 41/0893* (2013.01); *H04L 41/145* (2013.01); *H04W 24/02* (2013.01); *H04W 24/04* (2013.01); *H04W 72/10* (2013.01); *H04L 5/0037* (2013.01); *H04Q 11/0478* (2013.01); *H04W 84/042* (2013.01); *H04W 84/18* (2013.01)

(58) Field of Classification Search
USPC .................... 455/418, 450, 424; 370/252
See application file for complete search history.

(56) References Cited

U.S. PATENT DOCUMENTS

| | | | |
|---|---|---|---|
| 9,369,893 B2 | 6/2016 | Nuss et al. | |
| 9,490,634 B2* | 11/2016 | Zhang | .................. H02J 1/10 |
| 2003/0169762 A1 | 9/2003 | Wee Ho et al. | |
| 2004/0008691 A1 | 1/2004 | Winter et al. | |
| 2011/0096687 A1 | 4/2011 | Dottling et al. | |
| 2011/0176424 A1 | 7/2011 | Yang et al. | |
| 2012/0177016 A1 | 7/2012 | Trainin | |
| 2012/0180047 A1 | 7/2012 | Cardona | |
| 2012/0250498 A1 | 10/2012 | Johansson et al. | |
| 2013/0143561 A1* | 6/2013 | Nuss | ..................... H04W 24/02 455/436 |
| 2013/0242720 A1* | 9/2013 | Chou | ................ H04W 28/0268 370/221 |
| 2013/0242736 A1 | 9/2013 | Tarraf | |
| 2013/0242880 A1* | 9/2013 | Miao | ....................... H04L 5/001 370/329 |
| 2013/0260745 A1 | 10/2013 | Johansson et al. | |
| 2013/0272149 A1 | 10/2013 | Tse | |
| 2013/0331079 A1* | 12/2013 | Racz | ..................... H04W 24/02 455/418 |
| 2014/0031006 A1* | 1/2014 | Moore | ................... H04W 24/02 455/405 |
| 2014/0040450 A1 | 2/2014 | Sanneck | |
| 2014/0064247 A1 | 3/2014 | Teyeb et al. | |
| 2014/0140278 A1 | 5/2014 | Chou | |
| 2014/0274061 A1* | 9/2014 | Yao | ................... H04W 36/0094 455/436 |
| 2014/0355484 A1* | 12/2014 | Foster | ................... H04W 24/02 370/255 |
| 2015/0026327 A1* | 1/2015 | Tang | ..................... H04L 41/044 709/223 |
| 2015/0031354 A1 | 1/2015 | Nuss et al. | |
| 2015/0373563 A1 | 12/2015 | Chou | |

* cited by examiner

METHOD AND SYSTEM FOR COORDINATING CELLULAR NETWORKS OPERATION

RELATED APPLICATION

This Application is a continuation (and claims the benefit of priority under 35 U.S.C. §120) of U.S. Continuation application Serial No. 14/514,732, filed on Oct. 15, 2014, entitled "METHOD AND SYSTEM FOR COORDINATING CELLULAR NETWORKS OPERATION," INVENTORS ZIV NUSS, ET AL., which Application is a continuation (and claims the benefit of priority under 35 U.S.C. §120) of U.S. application Serial No. 13/902,906, filed May 27, 2013, entitled "METHOD AND SYSTEM FOR COORDINATING CELLULAR NETWORKS OPERATION," INVENTORS ZIV NUSS, ET AL. now U.S. Pat. No. 8,903,373 issued on Dec. 2, 2014. The disclosure of the prior applications are considered part of (and are incorporated by reference in) the disclosure of this application.

TECHNICAL FIELD

The present invention relates to methods and systems for optimizing operation of cellular networks and more specifically to a system that enables synchronization and coordination of operations carried out by various devices belonging to such cellular networks.

BACKGROUND

One of the major requirements which every cellular network operator faces is to ensure that the network is operating to its maximum efficiency. As a result, cellular network optimization is a major feature of many modern cellular networks.

In order to guarantee the best possible performance to the cellular network subscribers, the network is periodically optimized so that its resources can be more effectively utilized within the core network and/or the Radio Access Network.

Automatic Radio Access Network ("RAN") management is not a matter of choice any more. Without it, modern radio networks would not be able to cope with their rapidly changing commercial environment, whose characteristics include:
  Data usage is exploding while ARPU remains flat —forcing operators to drive down cost per bit in order to protect their margin profits;
  Traffic patterns have become dynamic and unpredictable—making static optimization practices practically obsolete;
  Traffic increasingly moves indoors—away from the coverage of macro networks;
  The proliferation of new forms of base stations (small cells, Wi-Fi) opens an opportunity to drive costs down by commoditizing RAN equipment These trends lead to the creation of complex multi-layer, multi-vendor networks, mixing UMTS, LTE, macro, small cells and WiFi all together. Their users, nevertheless, expect a unified experience wherever they are, whatever service they are using. Only a network that is automatic and self-optimizing can handle this complexity and dynamical conditions. From this perspective, it is clear that a multi-technology SON is a key requirement, as it allows the network to match the best access method for every usage scenario. It is also clear why SON'a multi-vendor capability is not optional but an essence for the modern mobile topology.

The Self-Organizing Network (hereinafter "SON") is an automation technology designed to make the planning, configuration, management, optimization and healing of mobile radio access networks simpler and faster. SON functionality and behavior has been defined and specified in generally accepted mobile industry recommendations produced by organizations such as 3GPP (3rd Generation Partnership Project) and the NGMN (Next Generation Mobile Networks).

Various technologies ar making use of SON features among which are WiFi, femto cells, Long Term Evolution (LTE) as well as older radio access technologies such as Universal Mobile Telecommunications System (UMTS). Newly added base stations should be self-configured in line with a 'plug-and-play' paradigm, while all operational base stations will regularly self-optimize parameters and algorithmic behavior in response to observed network performance and radio conditions.

In the past, the research work on SON for wireless networks has been focused mainly on stand-alone functions. However, with the increasing number of SON functionalities being implemented in the networks, the likelihood of conflicts arising during operations (i.e. while carrying out individual SON functions) also increases.

Therefore, a SON coordination is required in order to detect potential conflicts, avoid them by adequately harmonizing the policies and targets of SON functions, automatically resolve conflicts if and when they occur, and provide a single interface towards the operator regarding policies and targets setting, as well as SON system feedback.

One attempt to provide a solution to the above problems is described in "SON Coordinator—SOCRATES Approach" by Lars Christoph Schmelz, of Nokia Siemens Networks Oct. 20, 2010. However, the solution described in that publication is not completely satisfactory and does not provide adequate solution to various conflicts that arise while carrying out certain SON functions.

SUMMARY OF THE DISCLOSURE

The disclosure may be summarized by referring to the appended claims.

It is an object of the present invention to provide an apparatus and a method for providing adaptive policies for prioritization of actions to be taken in a self-organizing network, depending on identification of patterns of operations and performances.

It is another object of the present invention to provide an apparatus and a method for optimizing the operation of a cellular network which comprises multi technology/multi vendor, by synchronization and coordinating between different SON applications running at different layers (e.g. LTE, UMTS etc) while relying solely on network performance metrics.

It is yet another object of the present invention to provide an apparatus and a method for optimizing the operation of a cellular network by differentiating between "long term" and "short term" SON applications and coordinating there-between.

Other objects of the invention will become apparent as the description of the invention proceeds.

According to a first embodiment there is provided a Self Organizing Network (SON) element (e.g. a computing platform) operative to carry out at least two different SON related functions for improving operation of one or more cellular networks, wherein each of the least two different SON related functions is associated with at least one SON related action, wherein one or more SON related actions, initiated by triggering one of the at least two different SON related functions, would have been adversely affected by at least one other SON related action, initiated by triggering another one of the at least two different SON related functions, had the SON element not affected a modification in operating conditions of the one or more cellular networks, wherein the SON element is operative to:

(a) assign priorities to the at least two different SON related functions;

(b) assign different weights to at least two of the SON related actions; and (c) coordinate execution of SON related actions, that when executed, they are carried out in a way that does not breach the priorities hierarchy and the weights' order assigned to said at least two SON related actions, thereby improving operation of the one or more cellular networks.

According to another embodiment, the at least two different SON related functions are triggered by a single SON element. This can be done either by a centralized Self Organizing Network element (cSON) or by a distributed Self Organizing Network element (dSON).

In accordance with another embodiment, the at least two different SON related functions are triggered by different SON elements operative within the one or more cellular networks, e.g. one or more SON related functions are triggered by the SON element of the present invention, while one or more other SON related functions are triggered by another SON element. One of these different SON elements may be for example a cSON element while the other may be a dSON element or another cSON.

By yet another embodiment, the SON element is further operative to assign weights to each of the at least two SON related actions associated with a respective one of the at least two different SON relayed functions, wherein the same priority is assigned to each of these at least two different SON related functions.

According to still another embodiment, at least one of the assigned priorities and/or at least one of the assigned weights is dynamically updatable during operation of the one or more cellular networks.

According to another embodiment, the dynamic update of the least one of the assigned priorities and/or at least one of the assigned weights is based upon information retrieved (directly or indirectly, i.e. via a third party entity) by the SON element that relates to operational performance of the one or more cellular networks. Preferably, the retrieved information comprises statistical KPIs retrieved from a plurality of network elements belonging to the one or more cellular networks.

The term "KPI" is used herein throughout the specification and claims to denote a key performance indicator which is relates to performance measurement. KPI is a metric that provides necessary information to verify that a mission-critical service is monitored so that its availability, performance, and scalability are ensured. It is also a metric that can be used for possible troubleshooting.

In accordance with another embodiment, the assigned plurality of priorities and/or the assigned weights are selected to enable determining an order by which SON related actions will be carried out by one or more SON elements operative in the one or more cellular networks.

By yet another embodiment, the assigned priorities and/or the assigned weights are selected to enable determining whether two or more different SON related actions may be carried out concurrently within a certain area (e.g. a cell or a group of adjacent cells) of the one or more cellular networks. As will be appreciated by a person skilled in the art, the term "certain area" may also encompass the whole one or more cellular networks (or a substantial part thereof) when two or more different SON related actions have an impact on the whole cellular network and is not limited in its impact to one cell or a group of cells.

According to another aspect of the present invention there is provided a method for improving operation of one or more cellular networks by coordinating operations of at least two different Self Organizing Network (SON) related functions, wherein each of the least two different SON related functions is associated with at least one SON related action, wherein the one or more SON related actions if initiated by triggering one of the at least two different SON related functions, would have been adversely affected by at least one other SON related action initiated by triggering another one of the at least two different SON related functions, unless a modification in operating conditions of said one or more cellular networks is affected. The method comprises the steps of:

(a) assigning priorities to the at least two different SON related functions;

(b) assigning different weights to at least two of the SON related actions; and (c) coordinating execution of SON related actions, that when executed, they are carried out in a way that does not breach the priorities hierarchy and the weights' order assigned to the at least two SON related actions, thereby improving operation of the one or more cellular network According to another embodiment of this aspect, the at least two different SON related functions are triggered by a single SON element.

By yet another embodiment the at least two of the at least two different SON related functions are triggered each by a different SON element operative within the one or more cellular networks.

According to still another embodiment, step (b) comprises assigning weights to each of the at least two SON related actions associated with a respective one of the at least two different SON related functions, and wherein the same priority is assigned to each of these at least two different SON related functions.

In accordance with another embodiment, the method further comprises a step of dynamically updating at least one of the assigned priorities and/or at least one of the assigned weights during operation of the one or more cellular networks.

By still another embodiment, the method further comprises a step of retrieving information that relates to operational performance of the one or more cellular networks, for use in the step of dynamically updating the least one of the assigned priorities and/or at least one of the assigned weights. The retrieved information may comprise for example statistical KPIs retrieved from a plurality of network elements belonging to the one or more cellular networks.

According to another embodiment, the method provided further comprises selecting the assigned plurality of priorities and/or the assigned weights to enable determining an order by which SON related actions will be carried out in said one or more cellular networks.

By another embodiment, method provided further comprises selecting' the assigned priorities and/or the assigned weights to enable determining whether two or more different SON related actions may be carried out concurrently within a certain area of the one or more cellular networks.

In accordance with another embodiment, there is provided a computer program product encoding a computer program stored on a non-transitory computer readable storage medium for executing a set of instructions by a computer system comprising one or more computer processors for carrying out the method of the present invention.

Implementation of the device and method of the present invention involves performing or completing selected tasks or steps manually, automatically, or a combination thereof.

Moreover, according to actual instrumentation and equipment of preferred embodiments of the method and system implementing the present invention, several selected steps could be implemented by hardware or by software on any operating system of any firmware or a combination thereof. For example, as hardware, selected steps of the invention could be implemented by software embedded on chip or an ASIC and be part of that hardware.

As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

For a more complete understanding of the present invention, reference is now made to the following detailed description taken in conjunction with the accompanying drawings wherein.

DETAILED DESCRIPTION

Figure 1:
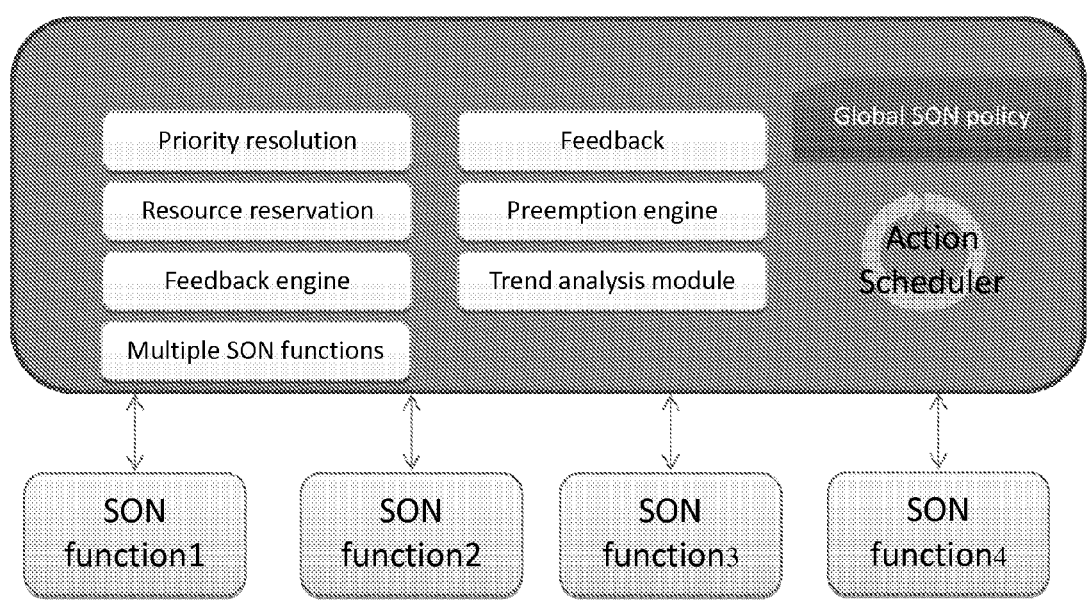
FIG. 1 demonstrates a block diagram of the exemplified cSON computing platform with its main functional blocks.

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, certain embodiments and numerous specific details are set forth in order to provide a thorough understanding of the present invention. It should be apparent, however, that the invention is not limited in its application to the details of construction and the arrangement of the components set forth in the following description or illustrated in the drawings and that the present invention may be practiced without these specific details.

As explained hereinabove, one of the main objects of the present invention is to provide a system and method that are used in optimizing the operation of a cellular network, preferably by coordinating and synchronizing the operation of a number of SON applications operative in that cellular network or in adjacent cellular sub-networks.

In current cellular systems, there is an obvious need to optimize network performance in accordance with variables such as traffic patterns, users' mobility patterns, network topology, load, changing end user requirements, field problems, new services launched and the like. If the operation of a cellular network is not being continuously optimized, its performance might degrade, which might lead to dropped calls, insufficient bandwidth causing degradation in the end user Quality of Experience (QoE), where the latter can be expressed by low accessibility, slow response times for data downloads, low retention of calls, etc.

As was previously described, the solution provided by the present invention aims to enable SON coordination in various cases to reduce or even eliminate any counter actions carried out when contradicting functions are fulfilled by one or more SON devices.

As a first example let us consider a SON device (e.g. a centralized SON, a.k.a "cSON") that is provided with several built in mechanisms to enable coordination between the different SON functions that are carried by that device thereby enabling provisioning of a holistic approach to network optimization. In this example, the SON device is adapted able to coordinate (while taking into consideration) operations that being carried out simultaneously:

by multi technology devices operating at the same time, such as LTE, UMTS, Small cells/HetNet and Wi-Fi technologies.

to adaptively learn the environment over long periods of time.

Seamlessly integrate equipment purchased from different vendors.

There is a large number of factors and use cases that impact the coordination between different SON functions. Following are some of the main factors:

TABLE 1

Factors that might have an impact upon coordination between different SON functions

| Factor | Description |
|---|---|
| Resource contention | There are few SON functions that require the same resource to solve network anomaly (load balancing (LB), Dynamic Interference Management (DIM) use of Common Pilot Channel (CPICH)). |
| KPI Feedback ambiguity | Action of one SON function may impact other SON functions that are monitored for obtaining the network's KPI's |
| Urgency | Different SON actions has different urgency for example: load balancing (LB), self-healing more urgent than DIM, CCO which may take long time to converge |
| Priority | Different SON functions/actions have different priority |
| Relative Weight | Different weights are associated with different actions having the same priority, for example for DIM the most interfering cells shall be worked first |

FIG. 1 demonstrates a block diagram of the exemplified cSON device with its main functional blocks.

SON Policy Definition

Preferably, the SON device is adapted to allow the customer to define his goals in terms of a set of network KPI's which in turn will define the SON optimization targets.

For example, the customer may define CS (DCR, accessibility) as being first priority for him while PS (accessibility, throughput) as being of a second priority. This set of KPI's will define a cost function which will be used as SON policy to define all the weights and priorities for the SON's actions for achieving network optimization.

Priorities of SON Functions

The SON assigns priorities for the different functions associated with it. It assigns defaults priorities to the different functions and these priorities may preferably be customized in case needed. For example, the priority of MLB function may be higher than that of the CCO function. This priority is required in order to get decision which function will run at a certain cell or area when there is a trigger for activating the two functions simultaneously.

Priorities of SON Actions

Each SON function which is about to trigger a SON related action provides a score (weight) for this action. This weight is applied by a set of priorities assigned to actions associated with the SON function. This score is also used for priorities associated with SON related actions carried out to differentiate between different SON functions that have the same priority, for example MLB, ICLB. The SON element (the functions' manager) is provided with all of the requests initiated by all SON functions and determines the scheduling, priorities and conflicts that might arise between the various SON functions.

SON Function Resource Reservation

When carrying out a SON function confirmed by the SON element (manager), the required resources will be provided for carrying out that SON function for a period of time that this function is operative. Confirmation for carrying' out other SON functions is based on the available resources and the resources allocated for the SON function that is already operative. For example, if MLB function uses CPICH resource, this resource cannot be used by a lower priority function such as CCO or DIM.

Temporal and Spatial Contention

Before executing a potential SON derived action, the required resources for executing this action are checked, as explained above. In addition, the affected area is preferably identified. The affected area includes all the surrounding area that may be impacted by this SON function. Before a SON action is being executed, the previous actions and performance of the affected area are assessed for a back period of typically few days up to a number of weeks. This assessment will constitute part of the decision on whether to trigger the action. When the action is triggered, the affected area shall be marked as being subjected to the specific SON action and also all other open actions thereat will be terminated. The affected area will preferably be monitored in order to retrieve the network performance thereat, as will be further discussed.

SON Feedback Cycle

Each SON action is preferably followed by feedback cycle. A feedback cycle is a period of time used to monitor the impact of the SON action. This monitoring is performed on the influenced cell and its associated affected area. It should be noted that the affected area is dependent upon the SON function. For example, ANR will have relatively small impacted area while DIM and COO may have large area that may be impacted from the parameters' modification. The SON actions will be considered to have positive effect if the SON policy KPI's are improved upon executing a given SON action.

Enabling Multiple SON Functions to Run Simultaneously

Ideally, only one SON action should be allowed to run so that it can be monitored to observe its impact upon the network performance. However this is not realistic wish, as in reality, multiple actions are required to be affected within the same. area. The easy use case to consider is short term SON functions and long term SON functions. It is necessary to allow short term SON functions to run even if there is already a long term SON function running at that area. For example, MLB is allowed to run when DIM is running concurrently. Another use case is to enable SON functions which do not require the same resources and do not have mixing feedback, to run in parallel. For example, it is possible to enable ANR to run in parallel with DIM. Thus, the SON device preferably provides an internal definition of the relations existing between different SON functions. This definition sets in turn the policy of whether one function may run when a certain other function is active.

This policy has preferably a default behavior and can be modified in case of a need.

TABLE 2

Example of an enablement matrix for SON applications

| Currently running actions | Actions that need to be triggered | | | | | | |
|---|---|---|---|---|---|---|---|
| | ANR-Intra | ANR-Inter | LB | ICLB | CCO | DIM | DSH |
| ANR-Intra | | Enable | Enable | Enable | Enable | Enable | Enable, trigger ANR-Intra in this case at crisis mode |
| ANR-Inter | Enable | | Enable | Enable | Enable | Enable | Enable, trigger ANR-inter in this case at crisis mode |

TABLE 2-continued

Example of an enablement matrix for SON applications

| Currently running actions | Actions that need to be triggered | | | | | | |
|---|---|---|---|---|---|---|---|
| | ANR-Intra | ANR-Inter | LB | ICLB | CCO | DIM | DSH |
| LB | Enable | Enable | | Enable | Do not run CCO while LB is still running | Do not run DIM while LB is still running | Preempt and run DSH |
| ICLB | Enable | Enable | Enable | | Enable | Enable | Preempt and run DSH |
| CCO | Enable | Enable | Enable | Enable | | Do not run | Preempt and run DSH |
| DIM | Enable | Enable | Enable | Enable | Do not run | | Preempt and run DSH |
| DSH | ANR Intra shall be crisis mode in this case | Crisis mode | Do not run at DSH-active area | Do not run at DSH-active area | Do not run at DSH-active area | Do not run at DSH-active area | |

There are cases where it is necessary to free resources allocated to a currently running SON function in order to execute an action associated with a higher priority. In this case, open SON actions may be terminated (preempted) in order to free the required resources for running the new SON function, followed by the provisioning of these required resources to new SON function. An example of such a use case is DIM running at specific area while it becomes essential to run a DSH (Dynamic Self-Healing) action at the very same area. The SON element (e.g. the function manager) will release the required resources for running the DSH function that have been used for carrying out the DIM action, and will enable running the DSH action at the same area.

SON Trends' Analysis Module

The SON trend analysis module is responsible for identifying long term network behavioral trends and to analyze them. For example, there are some cases where the SON function identifies an anomaly and then tries to fix it. However it might result in that the suggested fix will lead to deterioration in the overall network performance. In this case the SON will preferably mark this action and will avoid running the same action for a certain period of time. Such a policy will prevent unnecessary recurring actions. In addition, the SON trend function will identify more complex patterns such as timely recurring actions (e.g. oscillations or circular effect). In case the situation has been identified, the SON either performs correcting action in case it can solve the problem identified or will initiate an alert so that the use case can be monitored and a correction be provided. In addition, this module may log necessary information in order to enable offline analysis of the self-optimizing algorithms.

Now, although the SON of the present invention aims to minimize the conflicts that might arise due to the operation of different SON entities, still, such conflicts may arise. Following are some examples of handling these conflicts in accordance with the solution provided by the present invention.

Centralized SON vs. other SON Combinations

Centralized SON (cSON) element is typically connected to Distributed SON elements (dSONs) by standardized Type2 interface (itf-N), through which it can manage the operations of dSON elements of different technologies and/or different vendors. Distributed SON elements are typically located in Network Elements (NE) while a centralized SON element could be located at the element management layer (EM) as well as at the network management layer (NM), depending on the RAN vendor. The management interfaces between these layers could be the following:

An interface between cSON to dSON—Type-2 (Itf-N)—This interface is a standardized interface and the ability of the cSON element to manage the elements is supported.

Figure 2:
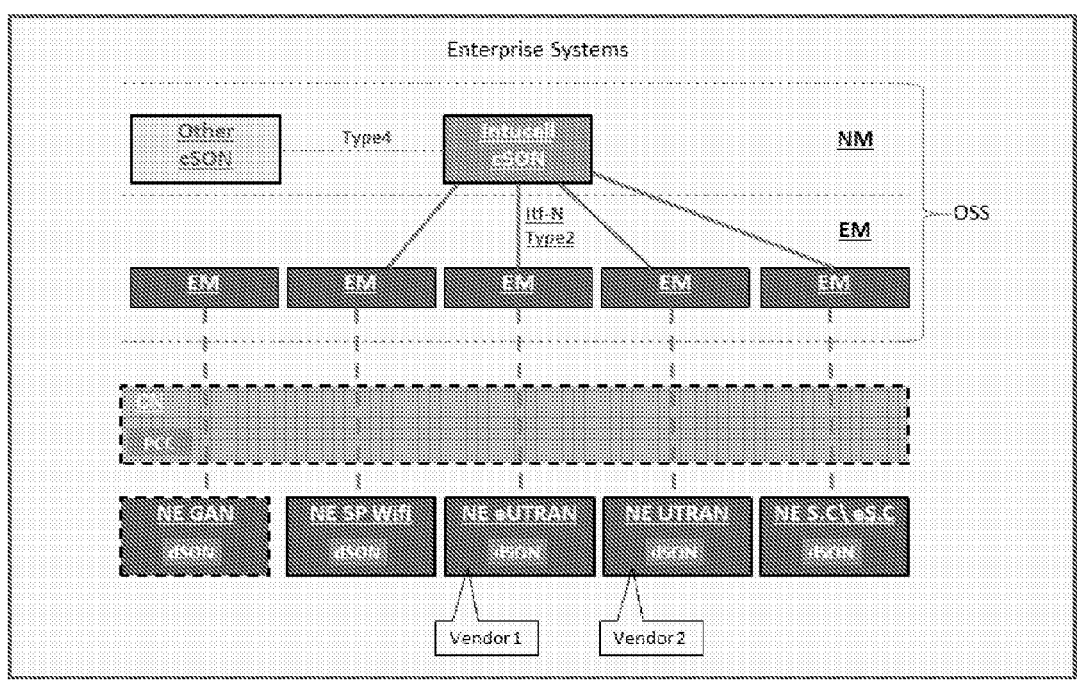
FIG. 2 presents a schematic view of a typical SON.

An interface between two cSONs—Normally cSON entities are located in the NM layer and the connecting interface between these entities is of Type-4. This Type-4 Interface is not standardized. For that reason the ability for interoperability of different cSON Vendors is low. A schematic view of a typical SON element is illustrated in FIG. 2.

The various combinations for coordinating actions of SON elements (devices) within such a network are the following:

cSON vs. dSON;

cSON application1 vs. a compatible. cSON application2 (e.g. of the same vendor);

cSON vs. a non compatible cSON (e.g. of a different vendor); and dSON vs. dSON.

One of the obstacles existing in the latter case, i.e. coordinating actions of dSON vs. dSON is that such a coordination would require a clear hierarchical structure, making it clear whisch SON element takes control over the other. When coordinating dSON elements of the same vendor, this is problem can be relatively easy solved, but in a multi vendor environment, where one SON function is triggered by a dSON element of one vendor and other SON function by a dSON element of another vendor, there must be a clear master-slave relationship in order for to carry out the required coordination. Obviously, when dealing with a cSON/dSON relationship, the "master" would always be the cSON. But for dSON—dSON relationship, the "master" can be selected for example by configuring one of the dSON elements to be the master, and one or more other dSON elements to be the slaves. Such a configuration would typically be done by the operator of the cellular network. In the alternative, the master-slave relationship can be automatically dictated by pre-defined rules which take into consideration the location of the dSON elements in the cellular network. For example, if one dSON element is located in a macro cell of the cellular network, whereas another dSON element is located in a small cell of a HetNet, the dSON element located at the higher network hierarchy (at the macro cell) will become the master SON element and will therefore decide which of competing actions triggered by these two dSON elements, will be carried out first, whereas the other dSON element will become the slave dSON element, obeying the order of actions as dictated by the master dSON.

As was previously discussed, according to an embodiment of the present invention, the SON element is adapted to carry out the following operations:
a) assign priorities to the at least two different SON related functions;
b) assign different weights to at least two of the SON related actions; and
c) coordinate execution of SON related actions., that when executed, are carried out in a way that does not breach the priorities hierarchy and the weights' order assigned to the at least two SON related actions, thereby improving operation of the one or more cellular networks.

The following examples focus mainly on operation (c), namely the coordination of the SON related actions when being executed, and demonstrate various embodiments of the present invention which aim to resolve certain conflicts that may arise when two or more SON related applications (functions) run in parallel and affect each other's operation, after having assigned the priorities to the various functions to be triggered by SON elements, and the relative weights to differentiate between SON related actions, among which SON related actions that have the same priority.

EXAMPLE 1

Conflicting Decisions Within the Same SON Application

When a distributed PCI Assignment function is activated, there could occur situations of PCI conflict/confusion. To prevent these situations from occurring, the distributed PCI Assignment function is invoked under supervision of centralized PCI Assignment function. Then, in case of a conflict, the centralized function intervenes and resolves the conflict. Supervision by the centralized function will also resolve the problem of joint operations of distributed SON functions supplied by different vendors. In this example the Instance Cycle A (Auto PCI Assignment): PCI-100 is allocated to a new macro cell B based on the neighbor cell configuration in the relevant region. In instant Cycle B (PCI Conflict) there is a PCI conflict between macro cell E and macro cell F. Macro cell E is in the impacted region of instance A and instance B. New PCI are allocated to macro cell E to resolve the PCT conflict. Now, instance cycle A is an allocation of a PCI-100 to the new macro cell B. However, instance cycle B algorithm triggers an action (based on the PCI conflict) during instance cycle A, resulting in a PCI confusion (neighbor of a neighbor) between the new macro cell B and macro cell E.

Figure 3:
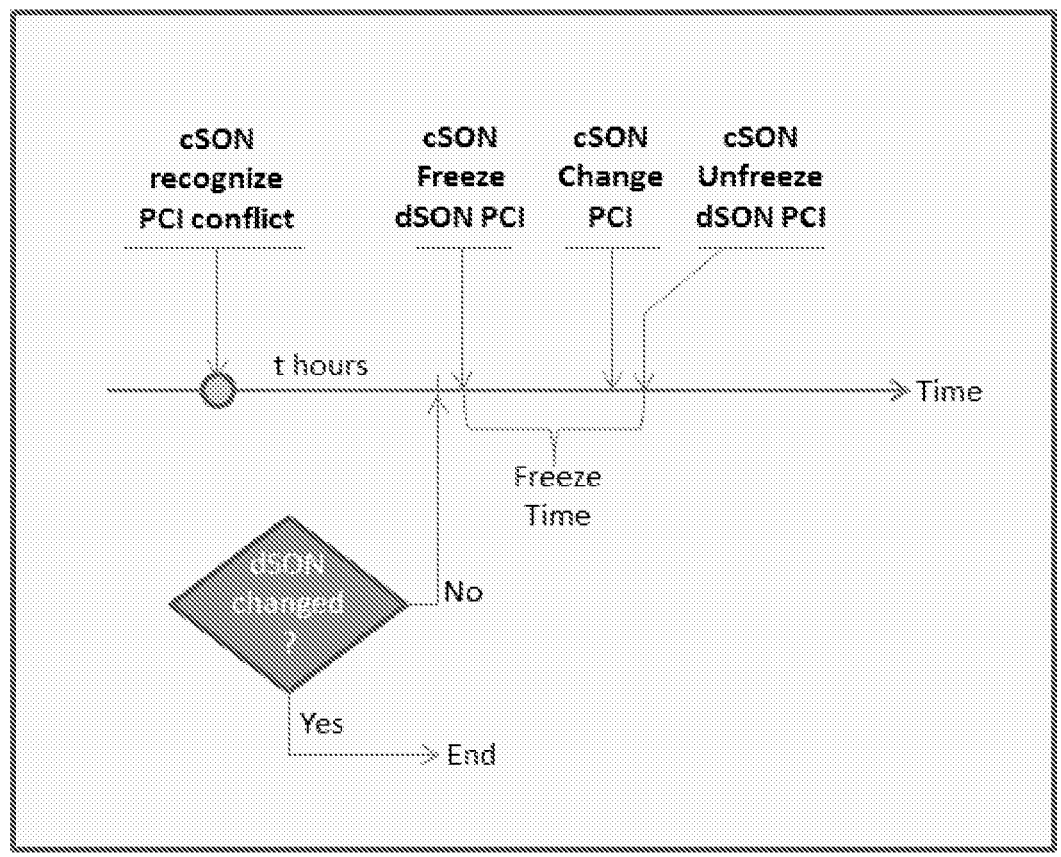
FIG. 3 illustrates schematically a solution to the operational conflict as discussed in Example 1.

A solution for such a conflict is demonstrated in the procedure presented in FIG. 3.

When the cSON application recognizes a PCI conflict or collision, in order to give a certain amount of time for the dSON to resolve that conflict, the cSON will wait a certain period of time (e.g. $t_1$ hours). Then, if the cSON does not detect a PCI change within that period of time (e.g. the last $t_1$ hours), the dSON is considered not to have resolved the conflict and the cSON will temporarily switch OFF the dSON PCI function for a predefined time (freeze time) for the cell and its neighbors (and preferably also neighbors of neighbors). During that freeze period, the cSON will be able to make an accurate decision for the right PCI. After the PCI has been changed, the functionality of the dSON PCI will be switched back on.

EXAMPLE 2

Oscillating Between Two SON Applications

Let us assume that the SON solution is defined for a short term and for a long term type of applications. Now, let us further assume that one application handles an increasing load (DLB) for a short period of time while the other application is operative to optimize coverage holes like (CCO) which is adapted to operate on a longer term snapshot period. For cells where a load balancing (LB) function has already been activated, the COO function will not be activated until the mass event function will complete its operation thereon. This is one example of the solutions that can be provided for the case of two cSON applications of a single vendor as was earlier explained.

For a case where the CCO which is operative in the cSON and MLB of in a dSON, operating well together, the centralized SON will be able of continuously manage the dSON working point and dynamic range of CPICH. In order to achieve that, the cSON determines the right working point and range according to performance indicators. It should be noted that different values may be applied for the working point and/or for the range when implemented in various cells because of either one or more of the following:
Different traffic;
Different RF planning; and
Different distribution of users inside cell service area.

Figure 4:
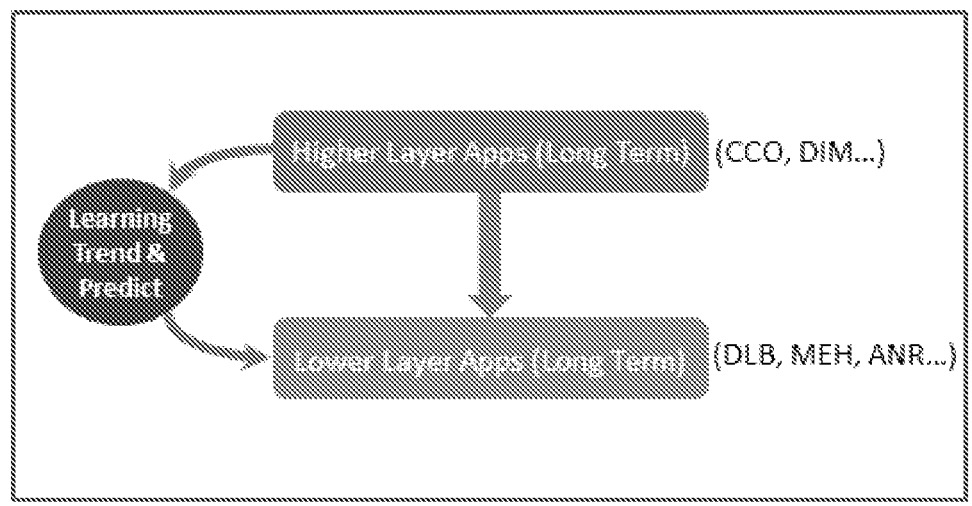
FIG. 4 illustrates schematically a solution to the operational conflict as discussed in Example 2.

According to the determination, the cSON will set (and preferably update) the right working point and the ranges, dynamically. A schematic representation of this solution is shown on FIG. 4.

EXAMPLE 3

Macro Cell and a Metrocell Group

This example is concerned with the case where a cSON is used for managing the Macro layer whereas dSONs are used for managing the Metro layer. For such a case, the cSON device may be used for coordinating between the Macro layer and the Metro layer by implementing the following method:
1. Setting a working point—starting with initial threshold values for the relevant pre-defined parameters (Tilts, CPICH power, Idle and Active mode behavior parameters, etc.).
1. Monitoring changes in the parameters' values
3. Checking the HNET coverage loss—this step is rather important, in particularly in a multi-vendor area.

4. Reconfiguring certain parameters:
   a. A new working point;
   b. dSON range—For the dSON there will be a CPICH range which will be adapted dynamically according to information retrieved about the area conditions.

Figure 5:
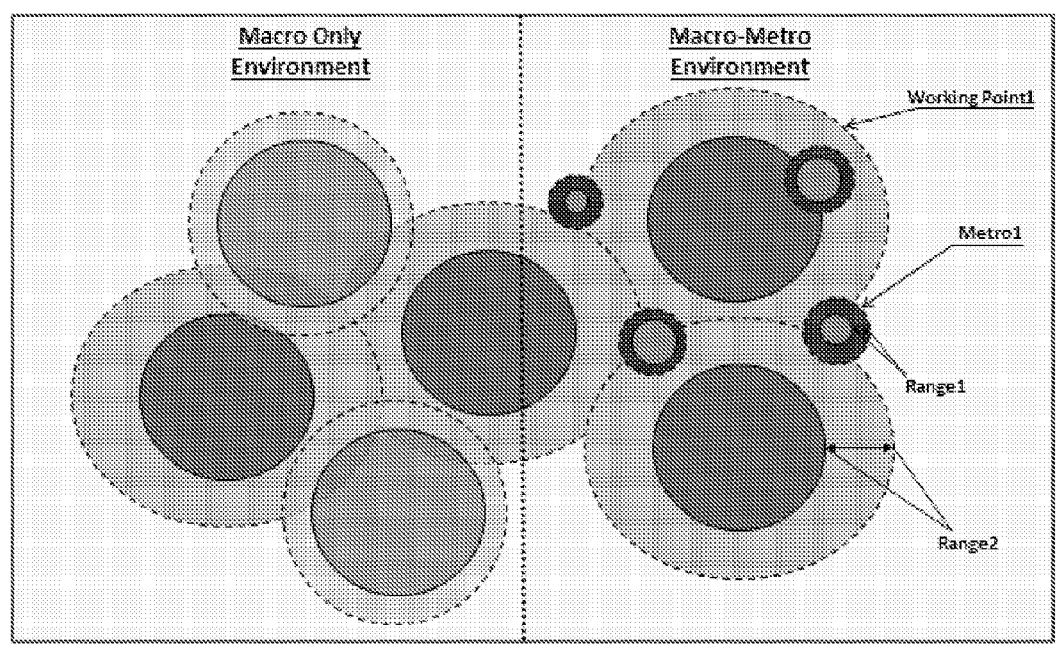
FIG. 5 illustrates schematically a solution to the operational conflict as discussed in Example 3.

The outcome of this solution is illustrated schematically in FIG. 5.

EXAMPLE 4

Two cSON Applications

This example refers to two cSON applications which are operative in partially overlapping area and that are compatible with each other (e.g. purchased from the same vendor).

One possible solution to overcome conflicts that might rise in such a scenario is to consider the different applications as short term and long term applications as was previously discussed. For example, the purpose of an application like CCO, which is considered as a long term application, is to increase coverage, a task that is based on a vast number of considerations with are typically ones that are associated with a long time scale. On the other hand, the purpose of LB (load balancing) application, considered as a short term application, is to handle an instantaneous increase in the traffic load, a phenomenon which is associated with a short time scale. For these cases, there are internal rules that are applied by an application manager which in turn determines the order for carrying out the various actions that are needed (i.e. acting as the SON function manager).

EXAMPLE 5

Two Different cSON Applications

Conflicts that arise from having two operative, different, partially overlapping cSON applications are quite possible. One option to solve such conflicts is by associating each of the SON applications with a wider monitoring area rather than a specific cell at which that SON application has made certain changes. Another solution is to ensure that no users will be transferred from a first cell to a second cell, even though that the first cell becomes loaded, unless there is a potential neighboring cell which is capable of handling the new additional load without becoming loaded itself (i.e. without triggering the load balancing application). The example discussed above relates to a case of two SON applications operating on networks based on the same technology and having the same RAN vendor. However, there are other scenarios where multi technologies and/or multi-vendors are used. One example for such a scenario is when an LTE cell offloads traffic to a UMTS cell, an action which improves the performance of the LTE network, but at the same time causes a decrease in the UMTS network performance. The cSON solution according to an embodiment of the present invention, preferably takes into consideration geographical area, multi-layer performance and time scale perspective. Time scale perspective refers to monitoring changes that occur, behavior of traffic and load being developed, over a period of time.

EXAMPLE 6 cSON Application that is Operative Simultaneously with dSON Application

Conflicts arising from operating in accordance with this example are quite possible in cases when Distributed SON (dSON) functions are deployed and operate without supervision by a centralized entity. This problem can be particularly severe in cases where BSs purchased from different vendors are deployed within the same area because of difference in various algorithms that are activated during operation such as ANR, MLB, ICIC etc. and/or due to X2 interoperability problems that arise.

The dSON entity may typically have visibility of a single BS, possibly also its nearest neighbors. Therefore, the dSON control is limited to a single BS. A centralized entity on the other hand, has the visibility of the whole network.

Thus, according to an embodiment of the present invention, the dSON operations are supervised and controlled by the Centralized SON (cSON), which requires the following OAM capabilities to be available over the Itf-N interface:

(A) to be able to enable/disable dSON functions on a per-BS basis and/or per-Neighbor Relation (NR) basis;
(B) to modify configuration of the dSON functions;
(C) to monitor the dSON operations in order to identify problems, such as oscillations (i.e. a ping pong effect where one entity makes a change and another entity reverses that change) across the network, etc.; and
(D) to implement changes in the dSON configuration changes or in extreme cases to disable dSON operations regarding the BSs, their neighbors or within a certain area, and to assume direct control thereat by cSON.

This approach, by which the centralized SON is provided with a capability to coordinate the operation of dSON entities across the network, also solves the interoperation problem when these dSON entities are provided by different vendors.

EXAMPLE 7

Multi-Vendor Scenario

Figure 6:
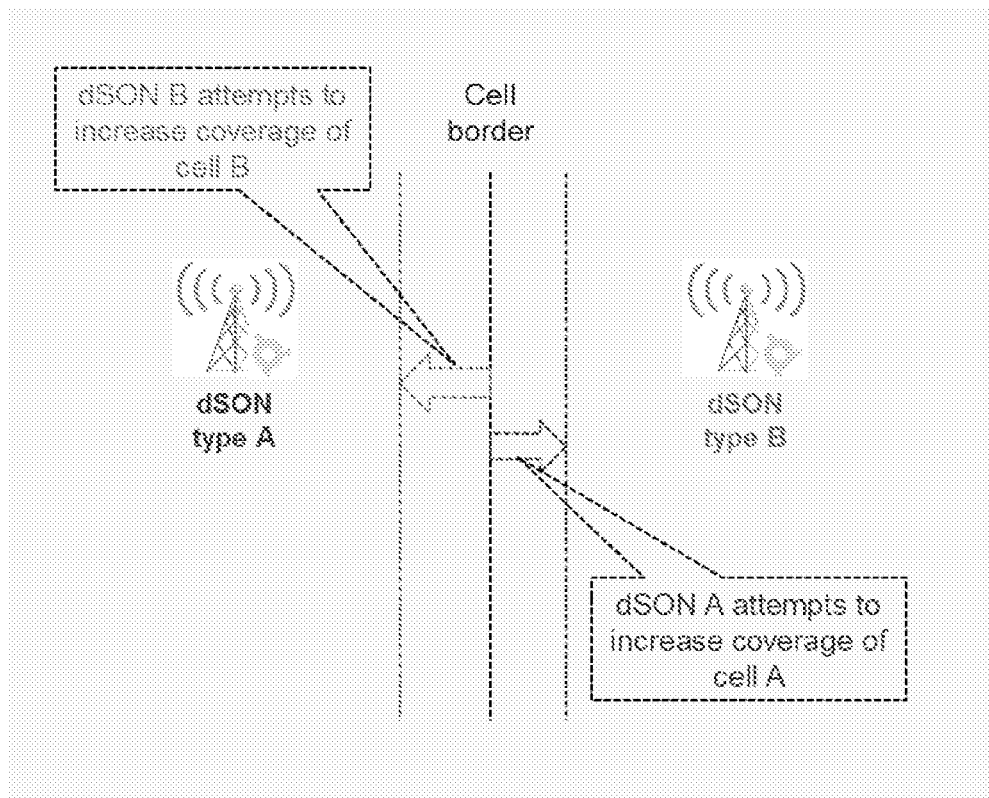
FIG. 6 illustrates a scenario where an operational conflict arises between various multi vendor entities of a cellular network as discussed in Example 7.

In a multi vendor scenario, there could be competing actions that are carried out by different SON entities derived from different vendors. A typical example might occur in a border area between two infrastructure. OEM vendors. Each vendor's eNB runs a separate instance of a dSON software, which is not coordinated with the eNB across the border, one that has been derived from a different vendor. This configuration is illustrated in FIG. 6.

Figure 7:
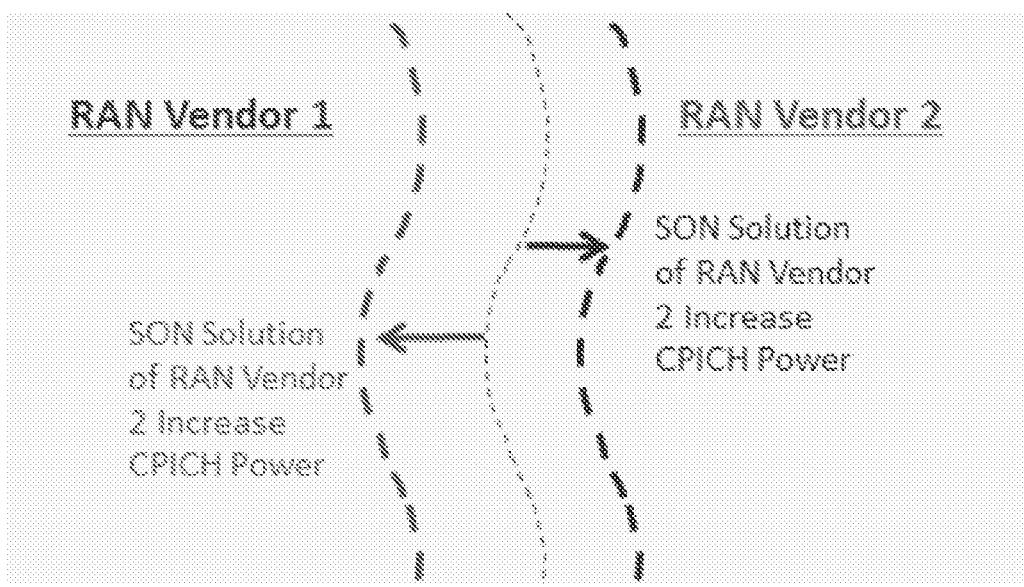
FIG. 7 demonstrates another scenario where an operational conflict arises between various multi vendor entities of a cellular network as discussed in Example 7.

In this example above, one SON function, for example dSON type A (from vendor A) might try to perform an action while dSON type B might try to carry out a conflicting action. Such actions could collide with each other in several ways. Following are some examples:

dSON A may try to shift traffic from cell A to cell B due to a certain reason (for example, power load) but then a second SON function (e.g. dSON B) might shift it back from cell B no cell A because of a different reason (for example, code Load).

dSON A might attempt to increase the coverage area of cell A while dSON B attempts to increase the coverage area of cell B at the same time, as demonstrated in FIG. 7. This might result in a non optimal handover (HO) performance or unnecessary reduction in capacity (for example due to increase in overlapping areas which in turn lead to development of interference).

Figure 8:
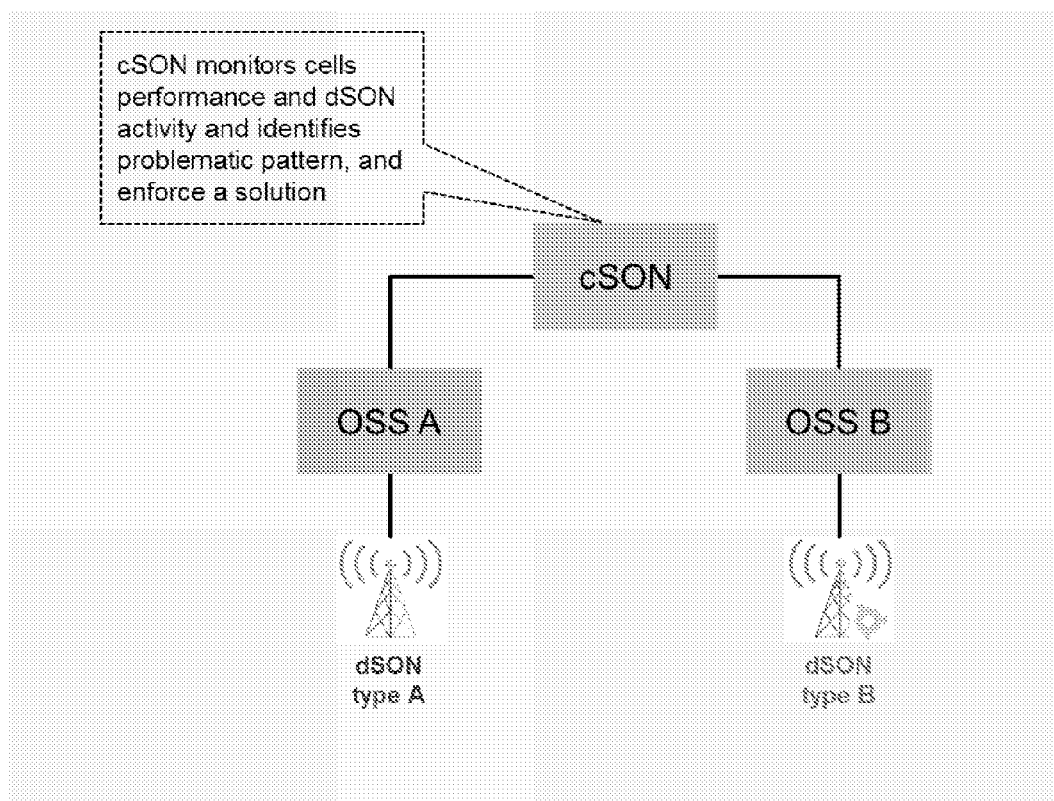
FIG. 8 illustrates schematically a solution to operational conflicts as discussed in Example 7.

A solution according to an embodiment of the invention is illustrated in FIG. 8, by which:

Similar to the multi technology case, also in the multi vendor case, a cSON entity is preferably connected to both domains, achieving a comprehensive overview of the performance of all the cells including dSON activity (based on the provided metrics for dSON operation provided by dSON OEM vendor).

The cSON entity will be able to identify and correlate operational patterns of dSON operations which are related to performance degradation (as in the cases presented above). In such cases the cSON entity will reconfigure one dSON of either dSONs, depending on the cSON algorithm implemented to solve the problem. For example, in the coverage extension case, the cSON will determine which is the preferred cell to cover the area, and will restrict the dSON of the other cell to increase the footprint of the cell, e.g. by limiting the effective power range available to the dSON in cell B.

Additional Conflicts that Might arise:

When a certain SON entity (DLB) triggers a decrease in the CPICH in order to decrease the load but at the same time, the retainability might degrade. In response to the latter effect, the SON entity might cause a reverse and excessive load to be generated, and these back and forth competing actions might continue.

One option to overcome this scenario is by assigning a different priority per KPI, which the operator can set. For example, CS retainability may be associated with a higher priority than PS retainability.

Another option that can be implemented in order to resolve this conflict is by allowing the cSON entity to dynamically decrease the CPICH through applying small steps every time such a decrease is made.

Triggering a load balancing action according to one threshold that is shared by all cells, although these cells may behave differently from the point of view of traffic and messages intensity. Implementing a cSON entity which monitors that various dSONs, allows adaptation of the threshold value on a per cell basis.

Low number of handovers that are carried out between a Macro Layer and indoor solutions (e.g. femtocells). In such cases, the SON entity assigns a different (lower) weight to these indoor solutions, and consequently, the Indoor solutions can be removed from the neighbor list of the respective macro cell.

The SON entities of different vendors may use different counters which in turn might calculate differently the performance of the very same network (or part thereof). Implementing a centralized SON solution results in having generic Key Performance Indicators for the SON cycle (Snapshot, Action and Feedback).

Cases where load balancing action is triggered due to power load in cell A which causes moving traffic (i.e. active users that are served by the BS or cell A) to cell B and then triggering another load balancing action due to code load that has been generated in cell B, causing the moving of traffic back to cell A. Therefore, according to an embodiment of the invention, the SON entity is adapted to take this scenario into consideration when it needs to prevent CPICH power change in cell B in order to prevent cell B from pulling back the traffic (users).

CCO action is aimed towards increasing cell coverage which in turn is likely to increase the traffic load at that cell, which might then trigger a load balancing action by initiating a CPICH decrease. Such a scenario is indeed possible, but by implementing the SON solution as provided by an embodiment of the present invention, it is possible to determine whether the network performance has been improved by obtained a better coverage and new traffic distribution to the cells, or whether this action has caused an adverse effect upon the network overall performance.

Feedback Conflicts

When two SON entities are in parallel, there are potential cases of feedback ambiguity. It might be unclear which action is responsible to a change in the network performance, and what is the net change that can be associated solely with that action.

According to another embodiment of the invention, when a second function (action) is executed within the same area, usually it is done because that second SON function has a higher priority. In this case, the SON functions manager takes into consideration that two SON functions are active and will coordinate the overall feedback that relates to the two actions. It may be more tolerant to temporal performance degradation due no the simultaneous actions. For example, let us consider a case that a long term DIM action is taking place. If a local load (congestion) is detected, an MLB action may be triggered. This latter action is obviously impacting the overall performance of the affected area. However, this impact is temporal and will disappear once the MLB action is completed, while for the DIM action the feedback cycle still continues. In case that the affected area degradation crosses a predefined threshold, the SON function manager will reverse both DIM and MLB actions.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method comprising:
   configuring a Self-Organizing Network (SON) policy for a cellular network based, at least in part, on one or more key performance indicators (KPIs) associated with operational performance of the cellular network;
   triggering one or more SON functions for one or more cells of the cellular network, wherein triggering a SON function causes execution of at least one SON related action;
   assigning a priority to each of the one or more SON functions based, at least in part, on the SON policy;
   assigning different weights for SON related actions for at least two SON functions based, at least in part, on the SON policy; and
   coordinating execution of the SON related actions for the at least two SON functions to optimize the operational performance of the cellular network.

2. The method of claim 1, further comprising:
   determining whether a particular KPI is improved based, at least in part, on execution of a particular SON related action.

3. The method of claim 1, wherein the at least two SON functions are assigned a same priority.

4. The method of claim 3, wherein coordinating execution of the SON related actions further comprises:
updating at least one of a particular priority and a particular weight for a particular SON related action for at least one of the at least two SON functions based, at least in part, on the one or more KPIs.

5. The method of claim 4, wherein the updating further comprises:
determining whether two or more different SON related actions can be carried out within a certain area of the cellular network.

6. The method of claim 5, wherein the certain area of the cellular network is at least one of:
a cell of the cellular network;
a group of adjacent cells of the cellular network; and
the cellular network and another cellular network.

7. The method of claim 3, wherein at least one of the at least two SON functions is a centralized SON (cSON) function included in a cSON network element and at least one of the at least two SON functions is a distributed SON (dSON) function included in a dSON element.

8. The method of claim 7, further comprising:
controlling operation and configuration of the dSON element by the cSON element to coordinate execution of the SON related actions.

9. A method comprising:
supervising operation of one or more distributed Self Organizing Network (dSON) elements by one or more centralized Self Organizing Network (cSON) elements of a cellular network based, at least in part, on at least one Self-Organizing Network (SON) policy;
coordinating execution of SON related actions for at least two SON functions associated with at least two of: any of the one or more dSON elements and any of the one or more cSON elements to optimize operational performance of the cellular network;
monitoring feedback information from a particular cell based on execution of the SON related actions; and
updating at least one of a particular priority and a particular weight for a particular SON related action for at least one of the at least two SON functions based, at least in part, on the feedback information and one or more key performance indicators (KPIs) associated with the SON policy.

10. The method of claim 9, further comprising
determining whether the operational performance of the cellular network is improved based on the one or more KPIs associated with the SON policy.

11. The method of claim 9, further comprising:
determining which of the SON related actions is associated with the feedback information based, at least in part, on priorities associated with the SON related actions.

12. The method of claim 9, wherein at least one cSON element is used for managing one or more cells of a macro layer of the cellular network and wherein the one or more dSON elements are used for managing one or more cells of a metro layer of the cellular network.

13. The method of claim 12, wherein coordinating execution of SON related actions further comprises:
setting a working point including threshold values for one or more cellular network parameters, wherein the setting is performed by the at least one cSON element;
triggering execution of the at least two SON functions, wherein each respective SON function of the at least two SON functions is associated with a respective dSON element and wherein triggering a SON function causes execution of at least one SON related action;
monitoring changes in values of the one or more cellular network parameters;
checking coverage loss for the cellular network; and
reconfiguring at least one of the working point and the one or more cellular network parameters to optimize operational performance of the cellular network.

14. The method of claim 13, wherein at least one of the one or more cellular network parameters is Common Pilot Channel (CPICH) power associated with each of the one or more cells of the metro layer of the cellular network.

15. The method of claim 14, wherein the reconfiguring includes increasing or decreasing the CPICH for at least one cell of the one or more cells of the metro layer of the cellular network to change a coverage area of the at least one cell of the metro layer.

16. The method of claim 15, wherein increasing or decreasing the CPICH for the at least one cell of the metro layer changes a load of the at least one cell of the metro layer and a load of at least one of the one or more cells of the macro layer.

17. A computer program product encoding a computer program stored on a non-transitory computer readable medium for executing a set of instructions by a computer system comprising one or more processors that, when executed by the one or more processors is operable to perform operations comprising:
configuring a Self-Organizing Network (SON) policy for a cellular network based, at least in part, on one or more key performance indicators (KPIs) associated with operational performance of the cellular network;
triggering one or more SON functions for one or more cells of the cellular network, wherein triggering a SON function causes execution of at least one SON related action;
assigning a priority to each of the one or more SON functions based, at least in part, on the SON policy;
assigning different weights for SON related actions for at least two SON functions based, at least in part, on the SON policy; and
coordinating execution of the SON related actions for the at least two SON functions to optimize the operational performance of the cellular network.

18. The computer program product of claim 17, the operations further comprising:
determining whether a particular KPI is improved based, at least in part, on execution of a particular SON related action.

19. The computer program product of claim 17, wherein the at least two SON functions are assigned a same priority.

20. The computer program product of claim 17, wherein coordinating execution of the SON related actions further comprises:
updating at least one of a particular priority and a particular weight for a particular SON related action for at least one of the at least two SON functions based, at least in part, on the one or more KPIs.

* * * * *